Feb. 13, 1968
W. H. REICH
3,368,838
SHIPPING CONTAINER COUPLING
Filed June 30, 1966
6 Sheets-Sheet 1
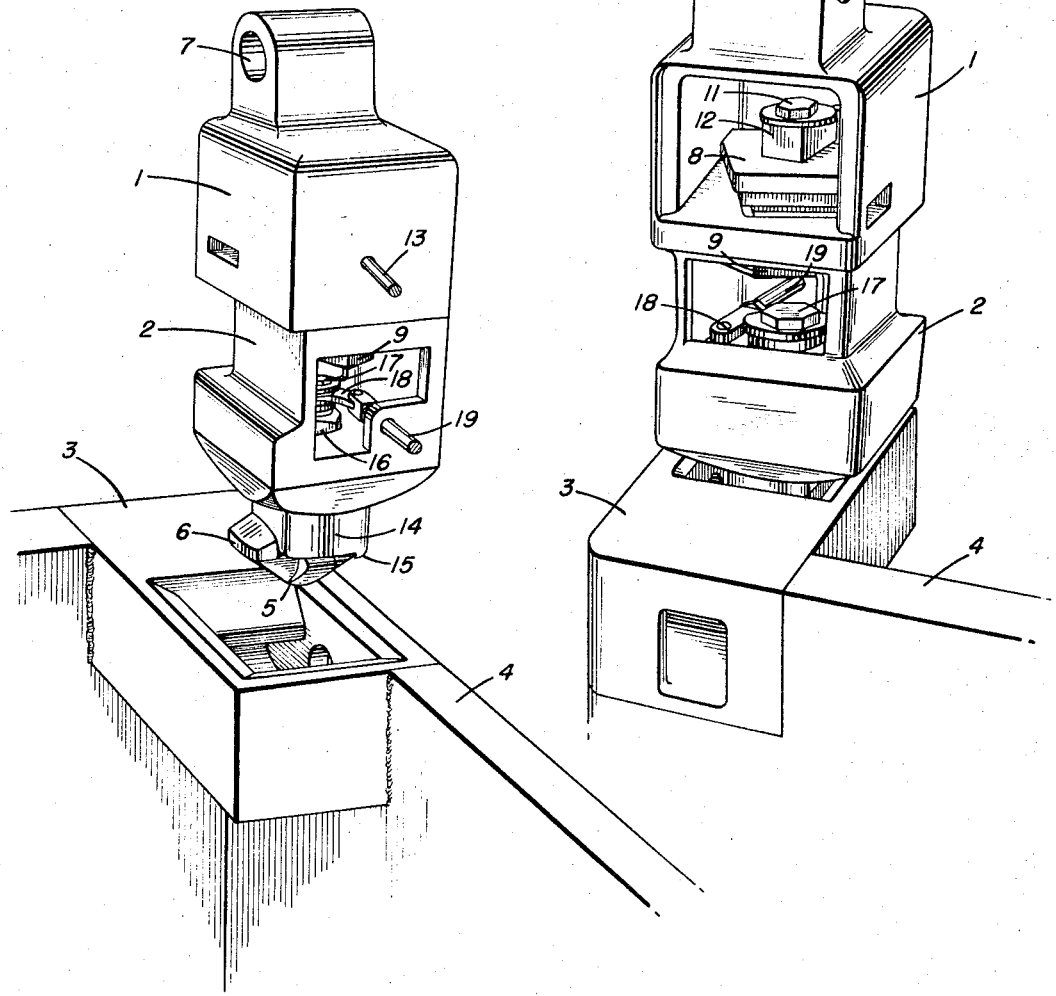
WILBURT H. REICH
INVENTOR
BY *Francis H. Duf*
ATTORNEY Feb. 13, 1968 W. H. REICH 3,368,838
SHIPPING CONTAINER COUPLING
Filed June 30, 1966 6 Sheets-Sheet 2

WILBURT H. REICH
INVENTOR

ATTORNEY

Feb. 13, 1968     W. H. REICH     3,368,838
SHIPPING CONTAINER COUPLING
Filed June 30, 1966     6 Sheets-Sheet 3

WILBURT H. REICH
INVENTOR

BY *Francis H Duf*

ATTORNEY

Feb. 13, 1968 W. H. REICH 3,368,838
SHIPPING CONTAINER COUPLING
Filed June 30, 1966 6 Sheets-Sheet 4

WILBURT H. REICH
INVENTOR

BY Francis H. Dief
ATTORNEY

Feb. 13, 1968 W. H. REICH 3,368,838
SHIPPING CONTAINER COUPLING
Filed June 30, 1966 6 Sheets-Sheet 5

WILBURT H. REICH
INVENTOR

BY Francis H. Duf
ATTORNEY

Feb. 13, 1968  W. H. REICH  3,368,838
SHIPPING CONTAINER COUPLING
Filed June 30, 1966  6 Sheets-Sheet 6
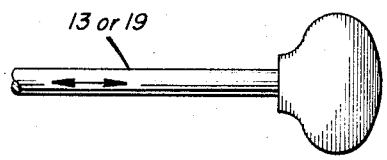
FIG. 13
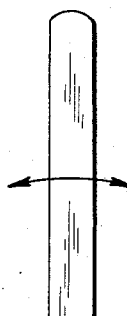
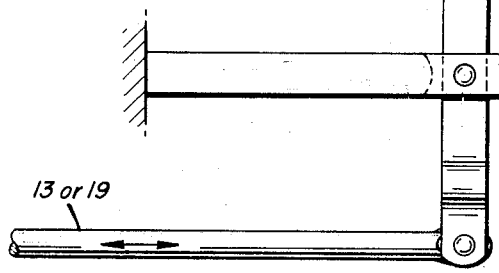
FIG. 14
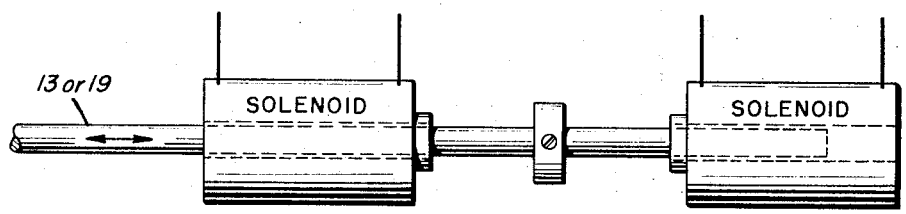
FIG. 15
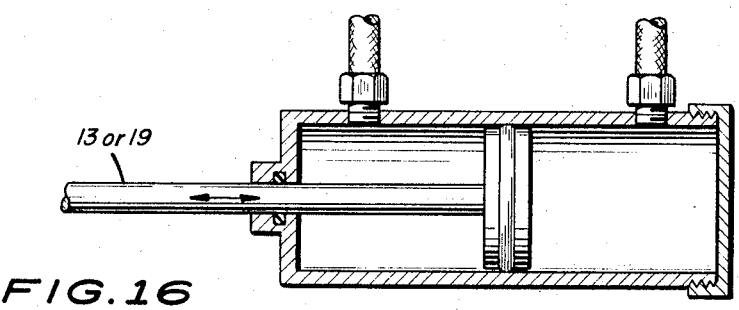
FIG. 16
WILBURT H. REICH
INVENTOR
BY *Frances H. Deef*
ATTORNEY United States Patent Office 3,368,838
Patented Feb. 13, 1968

3,368,838
SHIPPING CONTAINER COUPLING
Wilburt H. Reich, Kendall Park, N.Y., assignor to W. R. Grace & Co., New York, N.Y., a corporation of Connecticut
Filed June 30, 1966, Ser. No. 561,880
8 Claims. (Cl. 294—83)

ABSTRACT OF THE DISCLOSURE

A shipping container coupling comprising (a) a first housing, (b) a second housing slidably mounted under said first housing so as to move diagonally with respect to said first housing, (c) a means for moving said second housing diagonally with respect to said first housing, (d) a rotatable shaft extending from the bottom of said second housing and containing protrusions on opposite sides of said shaft towards the lower extremity, and (e) a means for rotating the shaft.

---

The present invention relates to a novel and useful coupling for a shipping container. More particularly, it relates to a coupling which may be used interchangeably with a plurality of different types of shipping containers.

In recent years, the larger shipping lines have been experimenting extensively with the use of containers which can be filled at the factory, hauled by trucks and directly loaded in specific compartments in the holds of ships. The containers are becoming fairly well standardized being 8 feet wide, 8 feet high and either 20, 30 or 40 feet long. The loading systems developed by each company, however, are somewhat different even though all contain a metal corner piece in each corner of the top of the container to which a cable or line is attached. A fairly common type of system is that developed by the National Castings division of the Midland-Ross Corporation. In this system, a metal corner casting is built into the container and the metal corner itself is approximately 5¼ inches wide, 8½ inches long, and 3¾ inches high. A rectangular hole (3 inches by 3¾ inches) is provided toward one end of the top of the corner for the coupling system. Recently, an International Standard has been proposed. In this system, the metal corner is approximately 6¾ inches long, 6½ inches wide and 4¾ inches high. A rectangular opening (2½ inches by 4¾ inches) with rounded ends is provided in the center of the top for the coupling system. Each of the aforementioned corners is hereinafter more specifically described by reference to the drawings. In the two systems, therefore, the opening for the couplings are not equidistantly spaced from the sides of the container so that the coupling mechanisms utilized in both systems are different. For this reason, any crane system containing a coupling for one type is substantially useless for the other type. Thus, the containers may not be interchanged in a shipping load and, if both types are to be handled, it requires two complete crane systems for loading. Obviously, if a coupling could be developed which would hold containers from both systems, it would eliminate many problems arising from intermixing the containers and would receive widespread acceptance in the art.

It is an object of the present invention to provide a coupling system which could utilize containers from both systems. A further object is to provide such a coupling which may be manually, hydraulically, or electrically operated. A further object is to provide a shipping container coupling which is adjustable both longitudinally and transversely to compensate for different dimensional relationships between corner centers. Other objects will become apparent as the description of the invention proceeds.

These objects are accomplished by the present invention which provides a shipping container coupling comprising (a) a first housing, (b) a second housing slidably mounted under said first housing so as to move diagonally with respect to said first housing, (c) a means for moving said second housing diagonally with respect to said first housing, (d) a rotatable shaft extending from the bottom of said second housing and containing two protrusions on opposite sides of said shaft towards the lower extremity, and (e) a means for rotating the shaft.

In a preferred embodiment of the present invention a backing plate is also provided which projects downwardly from the second housing and extends outwardly beyond the rear arc formed by the protrusions on said shaft. In a more preferred embodiment, the point to point distance between protrusions is from about 2½ inches to about 3¾ inches and the distance from the rear of the backing plate to the forward arc formed by the protrusions is from about 3 inches to about 4¾ inches. In a still more preferred embodiment, the backing plate contains a projection which limits the rotation of the shaft to an arc of about 90°.

The invention will be more readily understood by reference to the drawings.

FIGURE 1 is a perspective view of the rear and one side of the coupling over the first type of container corner. The coupling is in the unlocked position.

FIGURE 2 is a perspective view of the front and one side of the coupling in the first type of container corner. The coupling is in the locked position.

FIGURES 13, 14, 15, and 16 show respectively the manual means, the mechanical means, the electrical means and the hydraulic means for actuating the rods 13 or 19.

Figure 7:
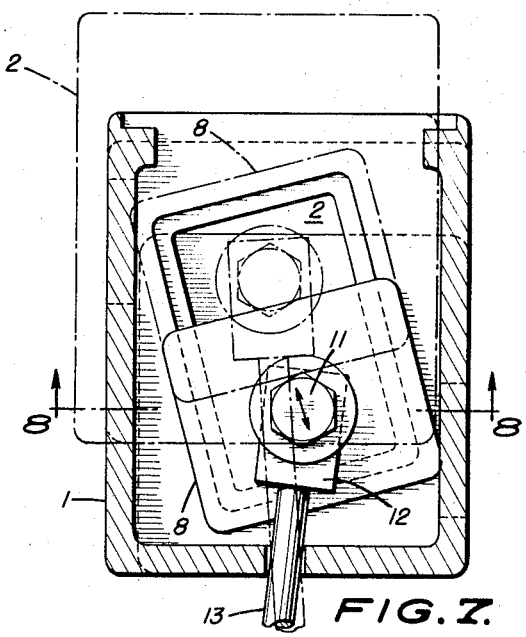
FIGURE 7 is a cross sectional view along line 7—7 of FIGURE 6.
Figure 8:
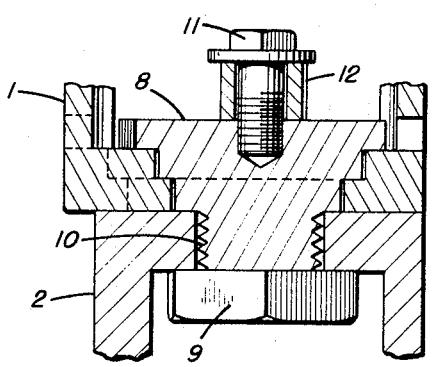
FIGURE 8 is a cross sectional view along line 8—8 of FIGURE 7.

In the figures, the first housing 1 is slidably connected to the second housing 2 by means of a slide 8 which is partially threaded in the form of a shaft 10. The slide 8 holds the two housings together by means of a nut 9 which is threaded on shaft 10 of the slide 8. A bolt 11 on the upper portion of the slide 8 holds the rod assembly 12 so that the slide may be actuated manually by pushing or pulling of rod 13. The sliding motion of the slide 8 can best be seen in FIGURE 7 in which the advanced position of the slide is shown in dotted lines. The upper portion of the first housing contains an eye 7 which serves as a fastening element so that the coupling may be connected to a cable for the crane system.

Figure 5:
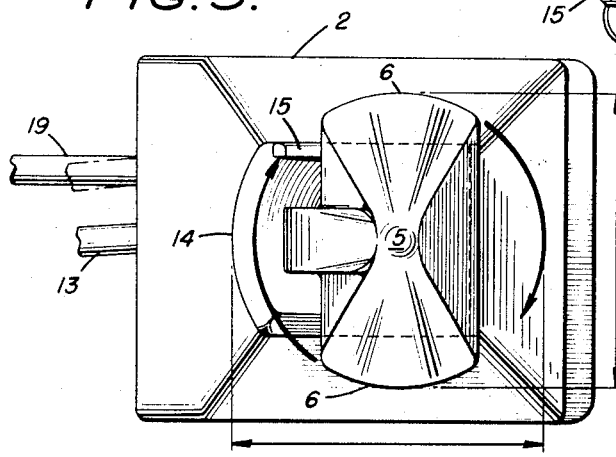
FIGURE 5 is a bottom view of the coupling.
Figure 6:
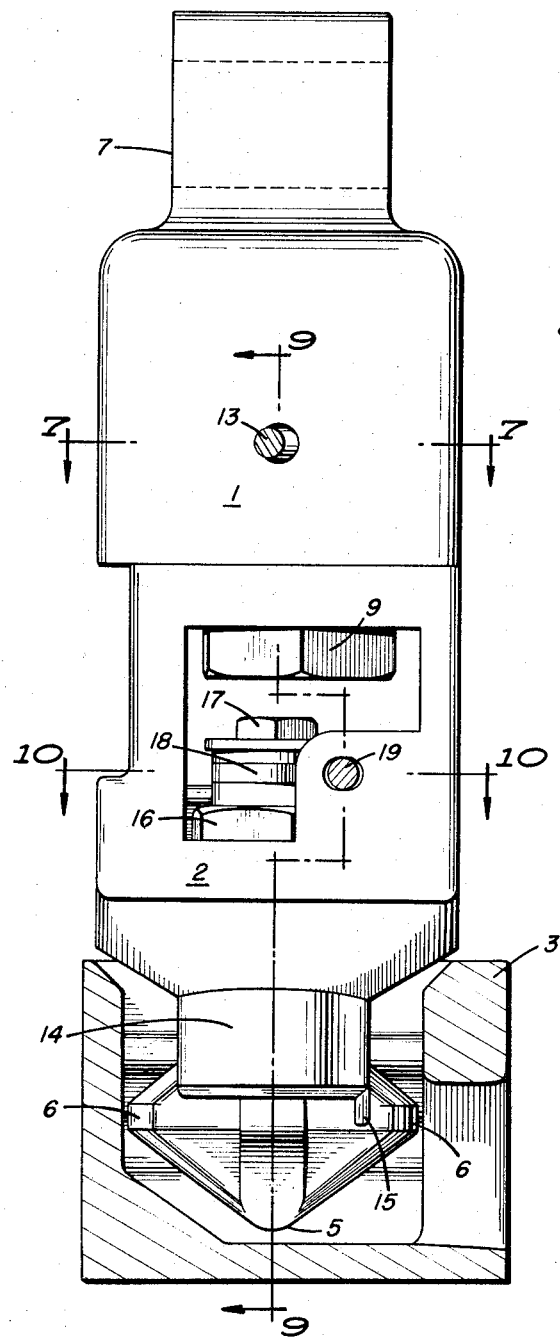
FIGURE 6 is a rear view of the coupling with the first type of container corner in cross section.
Figure 9:
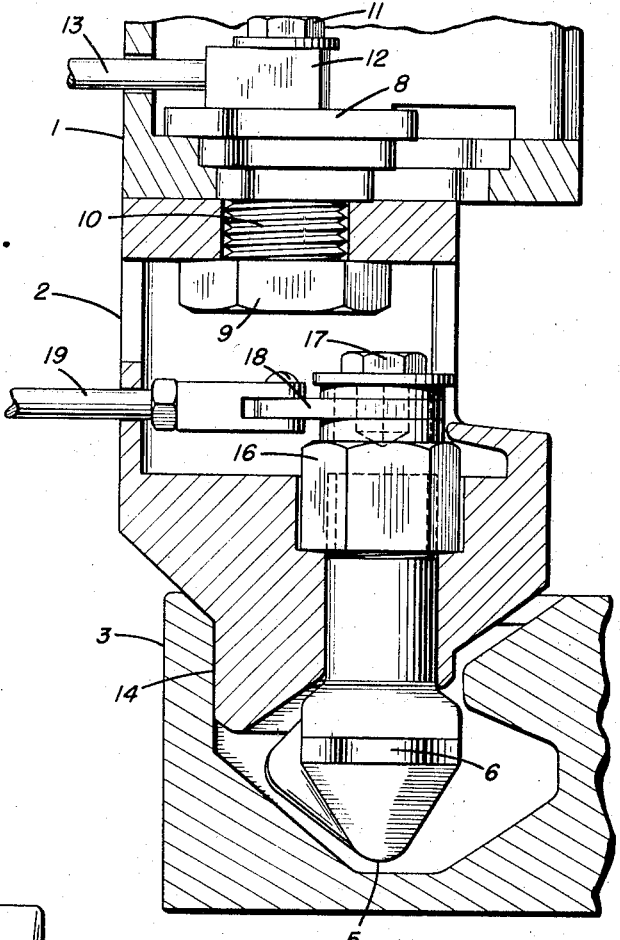
FIGURE 9 is a cross sectional view along line 9—9 of FIGURE 6.
Figure 10:
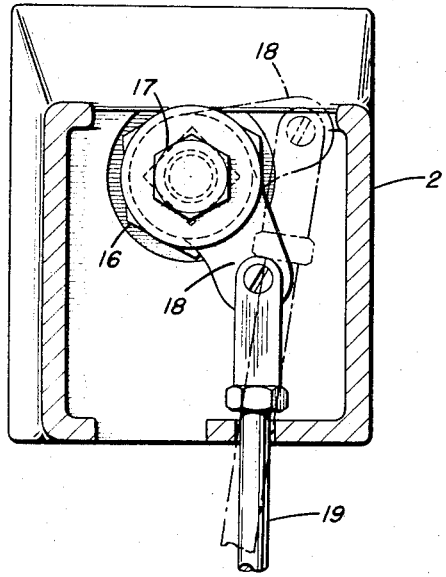
FIGURE 10 is a cross sectional view along line 10—10 of FIGURE 6.

The second housing 2 contains a rotatable shaft 5 which contains two protrusions 6 on opposite sides of the lower portion of the shaft 5. A backing plate 14 projects downwardly from the second housing 2 and extends outwardly beyond to the rearward arc formed by the protrusions of the rotatable shaft 5 as best shown in FIGURES 5 and 9. A projection 15 on the backing plate 14 limits rotations on the shaft to an 90° arc. The rotatable shaft 5 contains a threaded portion at its upper end and is connected to the second housing 2 by means of a nut 16. A bolt 17 holds the second rod assembly 18 on the rotatable shaft 5 so that the shaft may be rotated by pushing or pulling of the rod 19. The rotation of the rotatable shaft 5 can best be seen in FIGURE 10 in which the advanced position of the rod assembly is shown in dotted lines.

Figure 3:
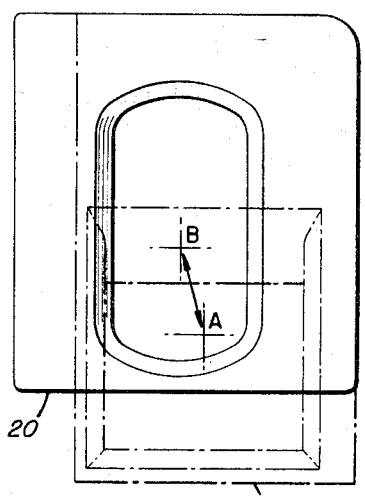
FIGURE 3 is a sketch of two types of corners one superimposed upon the other.
Figure 4:
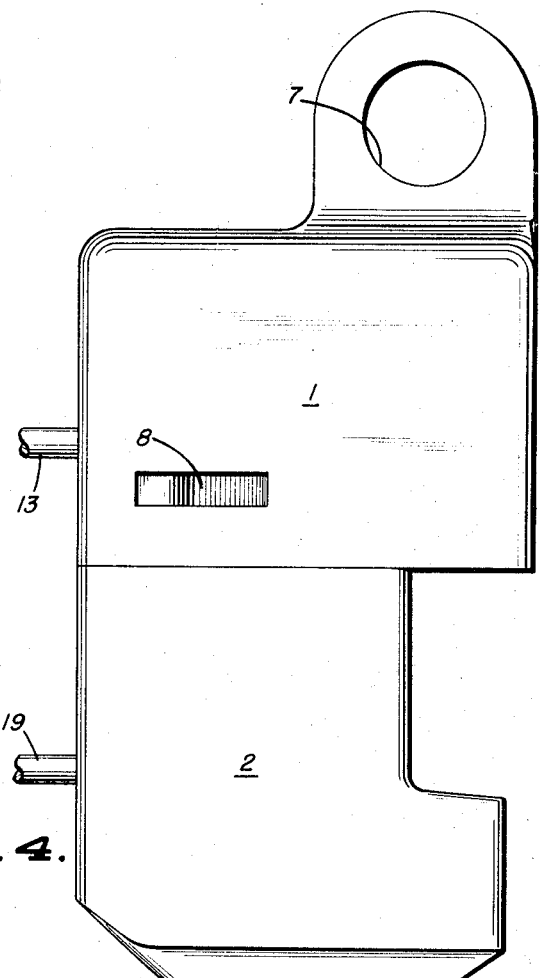
FIGURE 4 is a side view of the coupling. The side shown is opposite that shown in FIGURES 1 and 2.
Figure 11A:
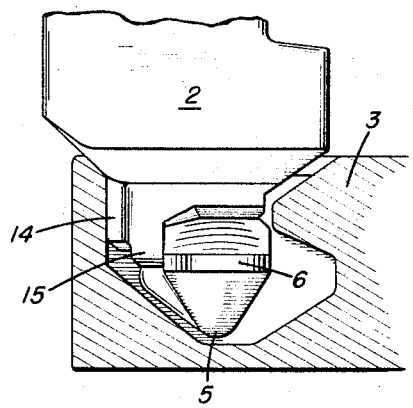
FIGURE 11a is a side view of the lower portion of the coupling in the unlocked position with the first type of container corner shown in longitudinal cross section.
Figure 11B:
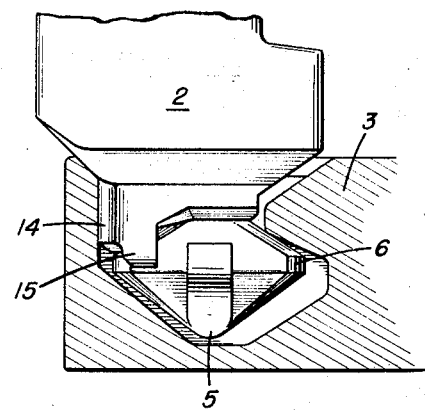
FIGURE 11b is a side view of the lower portion of the coupling in the locked position with the first type of container corner shown in longitudinal cross section.
Figure 12A:
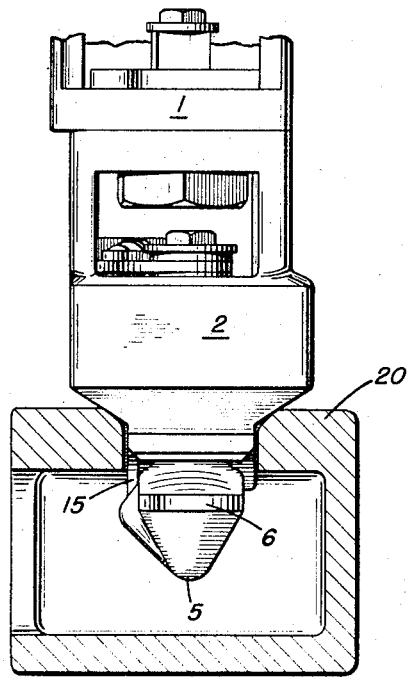
FIGURE 12a is a front view of the lower portion of the coupling in the unlocked position with the second type of container corner shown in transverse cross section.
Figure 12B:
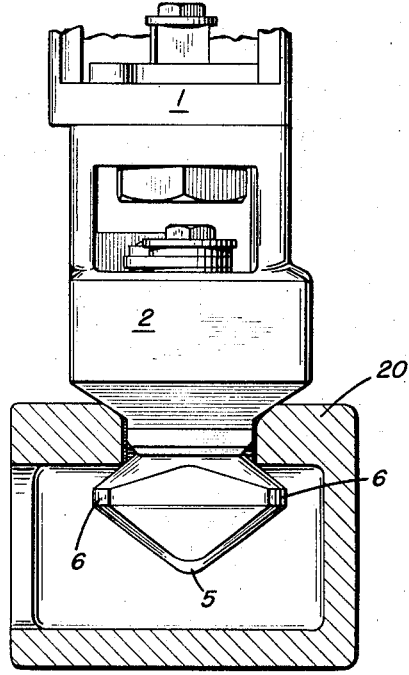
FIGURE 12b is a front view of the lower portion of the coupling in the locked position with the second type of container corner shown in transverse cross section.

In operation, two adjustments are necessary in changing from the first type of corner to the second type of corner. The first operation is the proper positioning of the rotatable shaft 5 over the appropriate portion of the opening of the first corner 3 or second corner 20. This can best be seen by reference to FIGURE 3 in which the second type of corner is positioned over the first type of corner. In changing from the first type of corner to the second, the assembly must be moved so that the shaft is centered on center B rather than center A which is required for the first corner. Thus, the slide 8 is actuated by rod 13 so as to move the bottom assembly from center A to center B of FIGURE 3. The housing is now properly positioned for the second corner. The second operation is merely the locking operation which is accomplished by rotating the shaft in the opening of either corner. It should be borne in mind, however, that the unlocked position of the first corner is the locked position of the second corner. Similarly, the locked position of the first corner is the unlocked position of the second corner. This is clearly shown in FIGURES 11a and 11b in which the first type of corner is shown in longitudinal cross section. In the figures, the rotatable shaft is inserted (FIGURE 11a) and turned 90° to the locked position (FIGURE 11b). As shown in FIGURES 12a and 12b the action is exactly the opposite for the second type of corner. In the second type of corner the protrusions on the shaft are alined with the housing and after insertion into the opening of the corner the shaft is rotated 90° to lock the coupling. Thus, the position of the shaft shown in FIGURE 12b is the same as that shown in FIGURE 11a. Also, the position of the shaft shown in FIGURE 12a is the same as that shown in FIGURE 11b. In the latter figures, however, the second housing has been moved diagonally with respect to the first housing.

The arc formed by the rotation of the shaft is clearly shown in FIGURE 5. In general, the point to point distance as shown in FIGURE 5 should be about 2½ inches to about 3¾ inches and the distance from the rear of the backing plate to the forward arc formed by the protrusions should be from about 3 inches to about 4¾ inches. However, if the coupling is to be modified so as to be adaptable to other containers corners these dimensions may be changed to correspond to the dimensions employed in the corner openings.

In FIGURE 13 the rods 13 or 19 are actuated by a longshoreman pushing the handle on the rod. In FIGURE 14, the rods 13 or 19 are actuated by a lever which has a mechanical advantage thereby making it easier to move the rod. In FIGURE 15, a conventional double solenoid is used to actuate the rods 13 and 19. By energizing either coil the rod moves towards the energized coil. Thus, the rod can be made to move in either direction by actuating either solenoid. In FIGURE 16 the rods 13 or 19 are actuated in either direction by forcing a fluid into either side of the cylinder to move the piston. All such means are conventional and would be obvious to one skilled in the art.

As can be seen from the foregoing description, the use of the coupling of the present invention allows the use of different types of container corners which may be intermixed and a single crane system can be utilized for handling both. As shown by the drawings the rod assemblies may be manually operated or operated by a hydraulic or air piston located within the housing. In addition, a simple electric system could be utilized to actuate either or both of the systems. In practice, a hydraulic system and electric system is generally available on the cranes actually utilized. Accordingly, it becomes a simple matter to extend the hydraulic or electric system to actuate the coupling device.

While the device has been described with regard to a specific embodiment of the invention, it is obvious that many other equivalent modifications would be apparent to those skilled in the art from a reading of the foregoing without a departure from the inventive concept.

I claim:

1. A shipping container coupling comprising (a) a first housing, (b) a second housing slidably mounted under said first housing so as to move diagonally with respect to said first housing, (c) a means for moving said second housing diagonally with respect to said first housing, (d) a rotatable shaft extending from the bottom of said second housing and containing protrusions on opposite sides of said shaft towards the lower extremity, and (e) a means for rotating the shaft.

2. A shipping container coupling comprising (a) a first housing, (b) a second housing slidably mounted under said first housing so as to move diagonally with respect to said first housing, (c) a means for moving said second housing diagonally with respect to said first housing, (d) a rotatable shaft extending from the bottom of said second housing and containing protrusions on opposite sides of said shaft towards the lower extremity, (e) a means for rotating the shaft, and (f) a backing plate which projects downwardly from said second housing and extends outwardly beyond the rearward arc formed by the protrusions on said shaft.

3. The coupling of claim 2 wherein the means for moving said second housing diagonally with respect to said first housing and the means for rotating said shaft are manually actuated.

4. The coupling of claim 2 wherein the means for moving said second housing diagonally with respect to said first housing and the means for rotating said shaft are mechanically actuated.

5. The coupling of claim 2 wherein the means for moving said second housing diagonally with respect to said first housing and the means for rotating said shaft are electrically actuated.

6. The coupling of claim 2 wherein the means for moving said second housing diagonally with respect to said first housing and the means for rotating said shaft are hydraulically actuated.

7. A shipping container coupling comprising (a) a first housing, (b) a second housing slidably mounted under said first housing so as to move diagonally with respect to said first housing, (c) a means for moving said second housing diagonally with respect to said first housing, (d) a rotatable shaft extending from the bottom of said second housing and containing protrusions on opposite sides of said shaft towards the lower extremity, (e) a means for partially rotating the shaft, and (f) a backing plate which projects downwardly from said second housing and extends outwardly beyond the rearward arc formed by the protrusions on said shaft, the point to point distance between protrusions being from about 2½ inches to about 3¾ inches and the distance from the rear of said backing plate to the forward arc formed by the protrusions being from about 3 inches to about 4¾ inches.

8. The shipping container coupling of claim 7 wherein a portion of the backing plate projects so as to limit the rotation of the shaft to about a 90° arc.

References Cited

UNITED STATES PATENTS 3,015,407  1/1962  Fesmire et al. _____ 220—1.5
3,088,768  5/1963  Willison _____ 294—93

ANDRES H. NIELSEN, *Primary Examiner.*

EVON C. BLUNK, *Examiner.*

R. D. GUIOD, *Assistant Examiner.*